(12) United States Patent  
Goodman et al.

(10) Patent No.: US 8,183,863 B2
(45) Date of Patent: May 22, 2012

(54) DISPLACED ELECTRODE AMPLIFIER

(75) Inventors: George D. Goodman, Phoenixville, PA (US); Edward J Harris, Pottstown, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 919 days.

(21) Appl. No.: 12/067,204

(22) PCT Filed: Nov. 10, 2006

(86) PCT No.: PCT/US2006/060774
§ 371 (c)(1),
(2), (4) Date: Mar. 18, 2008

(87) PCT Pub. No.: WO2007/059429
PCT Pub. Date: May 24, 2007

(65) Prior Publication Data
US 2009/0309591 A1    Dec. 17, 2009

Related U.S. Application Data

(60) Provisional application No. 60/736,105, filed on Nov. 10, 2005.

(51) Int. Cl.
*G01V 3/00* (2006.01)
(52) U.S. Cl. ........................................................ 324/303
(58) Field of Classification Search ........... 324/300–322
See application file for complete search history.

(56) References Cited

U.S. PATENT DOCUMENTS

| 3,086,195 A | 4/1963 | Halliday |
| 3,305,771 A | 2/1967 | Arps |
| 3,462,678 A | 8/1969 | Eaton |
| 3,470,457 A | 9/1969 | Howlett |
| 3,973,181 A | 8/1976 | Calvert |
| 4,012,952 A | 3/1977 | Dory |
| 4,072,923 A | 2/1978 | Siems et al. |
| 4,241,611 A | 12/1980 | Specht et al. |
| 4,361,808 A | 11/1982 | Kern et al. |

(Continued)

FOREIGN PATENT DOCUMENTS

EP    105801    4/1984

(Continued)

OTHER PUBLICATIONS

Bonner, S. et al., "A New Generation of Electrode Resistivity Measurements for Formation Evaluation While Drilling", SPWLA 35th Annual Logging Symposium, (Jun. 19, 1994), pp. 1-19.

(Continued)

*Primary Examiner* — Dixomara Vargas
(74) *Attorney, Agent, or Firm* — Krueger Iselin LLP

(57) ABSTRACT

A displaced electrode amplifier ("DEA") for measuring signals from high impedance sources. The amplifier may include an operational amplifier ("op-amp") configured as a unity gain buffer, with a feedback path to the non-inverting input to at least partly compensate for a parasitic input shunt impedance. In cases where the device is to measure AC signals in high ambient temperatures, the non-inverting input may be coupled via a large resistance to a ground reference that is driven with a second feedback signal to magnify the effective value of the large resistance. Where a differential configuration is desired, one or more tuning resistors may be provided to match responses of different input buffer stages, thereby maximizing the common mode rejection. The disclosed amplifier is suitable for use in oil-based mud resistivity imaging tools but is also suitable for other applications.

18 Claims, 6 Drawing Sheets

U.S. PATENT DOCUMENTS

| | | |
|---|---|---|
| 4,468,623 A | 8/1984 | Gianzero et al. |
| 4,532,615 A | 7/1985 | Ballinger |
| 4,567,759 A | 2/1986 | Ekstrom et al. |
| 4,677,367 A | 6/1987 | Goodman |
| 4,692,707 A | 9/1987 | Locke et al. |
| 4,718,011 A | 1/1988 | Patterson |
| 4,931,737 A | 6/1990 | Hishiki |
| 5,044,462 A | 9/1991 | Maki |
| 5,144,126 A | 9/1992 | Perry et al. |
| 5,160,925 A | 11/1992 | Dailey et al. |
| 5,216,242 A | 6/1993 | Perry et al. |
| 5,235,285 A | 8/1993 | Clark et al. |
| 5,251,708 A | 10/1993 | Perry et al. |
| 5,278,550 A | 1/1994 | Rhein-Knudsen et al. |
| 5,331,318 A | 7/1994 | Montgomery |
| 5,339,037 A | 8/1994 | Bonner et al. |
| 5,359,180 A | 10/1994 | Park et al. |
| 5,396,175 A | 3/1995 | Seeman |
| 5,570,024 A | 10/1996 | Vail et al. |
| 5,596,534 A | 1/1997 | Manning |
| 5,691,712 A | 11/1997 | Meek et al. |
| 5,861,771 A | 1/1999 | Matsuda et al. |
| 5,992,223 A | 11/1999 | Sabins et al. |
| 6,023,168 A | 2/2000 | Minerbo |
| 6,173,793 B1 | 1/2001 | Thompson et al. |
| 6,191,588 B1 | 2/2001 | Chen |
| 6,252,518 B1 | 6/2001 | Laborde |
| 6,268,726 B1 | 7/2001 | Prammer et al. |
| 6,332,109 B1 | 12/2001 | Sheard et al. |
| 6,348,796 B2 | 2/2002 | Evans et al. |
| 6,362,619 B2 | 3/2002 | Prammer et al. |
| 6,373,254 B1 | 4/2002 | Dion et al. |
| 6,396,276 B1 | 5/2002 | Van Steenwyk et al. |
| 6,518,756 B1 | 2/2003 | Morys et al. |
| 6,564,883 B2 | 5/2003 | Fredericks et al. |
| 6,583,621 B2 | 6/2003 | Prammer et al. |
| 6,600,321 B2 | 7/2003 | Evans |
| 6,603,314 B1 | 8/2003 | Kostelnicek et al. |
| 6,626,251 B1 | 9/2003 | Sullivan et al. |
| 6,636,406 B1 | 10/2003 | Anthony |
| 6,688,396 B2 | 2/2004 | Floerke et al. |
| 6,714,014 B2 | 3/2004 | Evans et al. |
| 6,717,501 B2 | 4/2004 | Hall et al. |
| 6,809,521 B2 | 10/2004 | Tabarovsky et al. |
| 6,815,930 B2 | 11/2004 | Goodman |
| 6,825,659 B2 | 11/2004 | Prammer et al. |
| 6,850,068 B2 | 2/2005 | Chemali et al. |
| 6,891,377 B2 | 5/2005 | Cheung et al. |
| 6,975,112 B2 | 12/2005 | Morys et al. |
| 7,109,719 B2 | 9/2006 | Fabris et al. |
| 7,119,544 B2 | 10/2006 | Hayman et al. |
| 7,139,218 B2 | 11/2006 | Hall et al. |
| 7,145,472 B2 | 12/2006 | Lilly et al. |
| 7,154,412 B2 | 12/2006 | Dodge et al. |
| 7,207,396 B2 | 4/2007 | Hall et al. |
| 7,242,194 B2 | 7/2007 | Hayman et al. |
| 7,463,027 B2 | 12/2008 | Prammer et al. |
| 7,579,841 B2 | 8/2009 | San Martin et al. |
| 7,696,756 B2 | 4/2010 | Morys et al. |
| 7,733,086 B2 | 6/2010 | Prammer et al. |
| 7,888,941 B2 | 2/2011 | San Martin et al. |
| 8,030,937 B2 | 10/2011 | Hu et al. |
| 2002/0043369 A1 | 4/2002 | Vinegar et al. |
| 2002/0153897 A1 | 10/2002 | Evans |
| 2003/0155925 A1 | 8/2003 | Tabarovsky et al. |
| 2003/0173968 A1 | 9/2003 | Cheung et al. |
| 2003/0222651 A1 | 12/2003 | Tabanou |
| 2004/0124837 A1 | 7/2004 | Prammer et al. |
| 2004/0245991 A1 | 12/2004 | Hayman et al. |
| 2005/0067190 A1 | 3/2005 | Tabanou |
| 2005/0133262 A1 | 6/2005 | Chen et al. |
| 2005/0179437 A1 | 8/2005 | Hayman et al. |
| 2007/0046291 A1 | 3/2007 | Itskovich |
| 2007/0103161 A1 | 5/2007 | San Martin et al. |
| 2009/0309591 A1 | 12/2009 | Goodman et al. |
| 2010/0148787 A1 | 6/2010 | Morys et al. |
| 2010/0231225 A1 | 9/2010 | Morys et al. |

FOREIGN PATENT DOCUMENTS

| | | |
|---|---|---|
| EP | 1035299 | 9/2000 |
| GB | 2289340 | 11/1995 |
| GB | 2391070 | 1/2004 |
| GB | 2401185 | 3/2004 |
| WO | WO2005/059285 | 6/2005 |
| WO | WO2005/059285 A1 | 6/2005 |

OTHER PUBLICATIONS

Brown, J. A., et al., "Design and Fabrication of Annular Arrays for High Frequency Ultrasound", IEEE Transactions on Ultrasonics, Ferroelectrics, and Frequency Control, vol. 51, No. 8, Aug. 2004, 8 pgs.

Davis, Leroy, "CAN Bus", Leroy's Engineering Website, www.interfacebus.com/Design_Connector_CAN.html, (2004), 7 pgs.

Franklin, Curt "How DSL Works", How Stuff Works, http://computer.howstuffworks.com/dsl.htm., (2004), 5 pgs.

Millman, Jacob, "Microelectronics; Digital and Analog Circuits and Systems", McGraw-Hill, Figures 16-8, 16-10(a), 16-11, 17-28, (1979), pp. 573-577 and 654.

Morys, Marian et al., "Field Testing of an Advanced LWD Imager for Oil-Based Mud Applications", SPWLA 51st Annual Logging Symposium, Jun. 19-23, 2010, pp. 1-13.

Piezo Technologies, "Piezo Technologies Material Properties 2010", 2010 PiezoTech, LLC, http:/www.PiezoTechnologies.com/pdf/keramos-material-specs.pdf, revised Sep. 2010, 1 pg.

Proakis, John G., "Second Edition Digital Communications", McGraw-Hill Book Company, New York, 1989, Chapter 6—pp. 519-696. (three electronic files).

Ritter, Rene N., et al., "High Resolution Visualization of Near Wellbore Geology Using While-Drilling Electrical images", SPWLA 45th Annual Logging Symposium,, The Netherlands, Jun. 6-9, 2004, pp. 1-13.

XE1203 TrueRF Datasheet, 2004.

FIG. 1
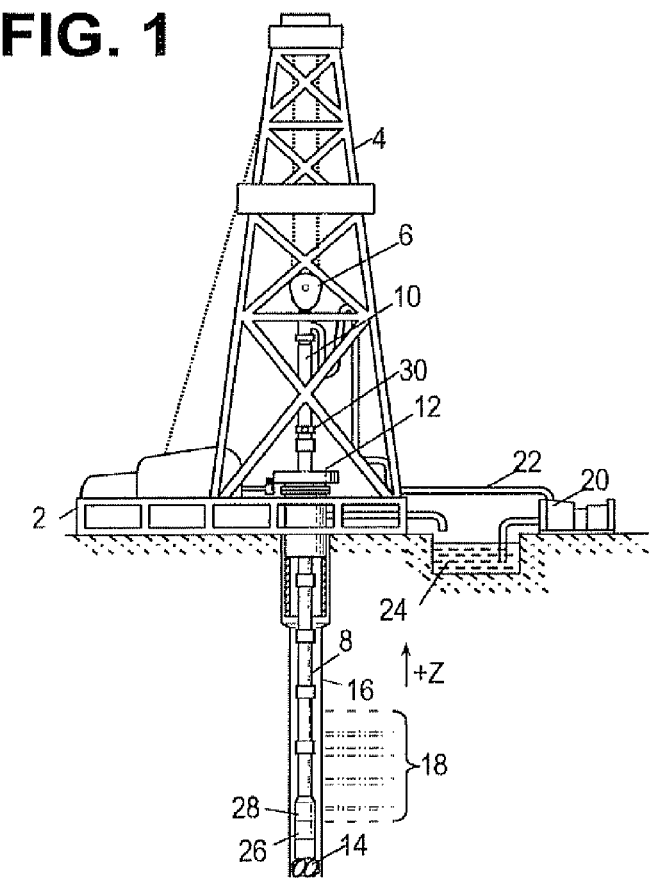
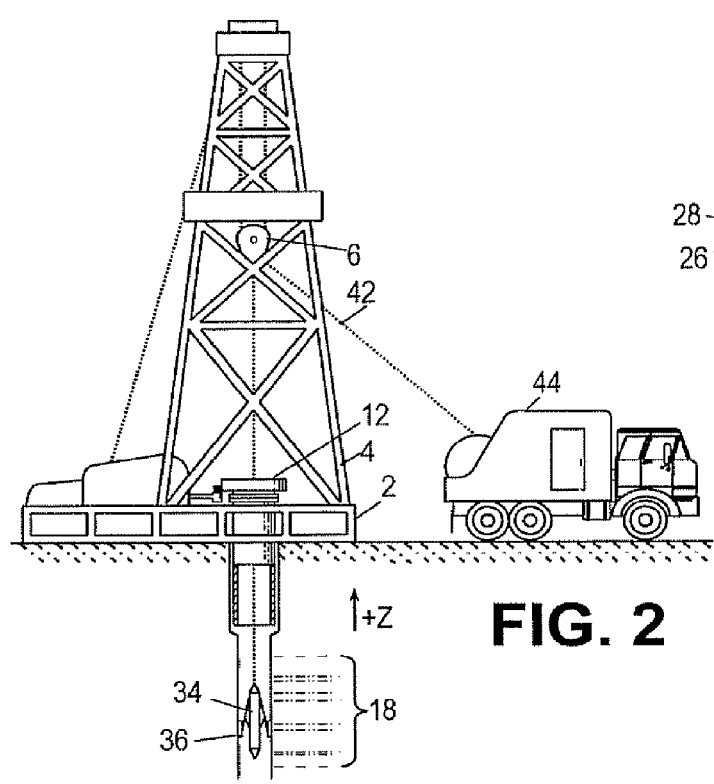
FIG. 2

DISPLACED ELECTRODE AMPLIFIER

CROSS-REFERENCE TO RELATED APPLICATIONS

The present application claims priority to provisional U.S. Patent Application 60/736,105, filed Nov. 10, 2005 and entitled "Displaced Electrode Amplifier", which is hereby incorporated herein by reference.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In both wireline and LWD environments, it is often desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure resistivity of the borehole surface on a fine scale. The resistivity measurements can be converted into pixel intensity values to obtain a borehole wall image. However, oil-based muds can inhibit such measurements due to the variability of impedance in the mud surrounding the tool.

U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity based on the injection of a current excitation signal and the subsequent measurement of the voltage drop across the formation. The voltage drop sensed between the voltage electrodes is amplified, conditioned, acquired, and used with a measured current flow to calculate an estimate of formation resistivity in front of the pad.

The implementation of a differential amplifier to measure a signal corresponding to the voltage drop in the formation encounters several obstacles. These obstacles include: the limitations inherent in the circuitry, the interactions of the sensor pad with the surrounding environment, the properties and standoff thickness of the mud, and the tilt angle of the pad relative to the formation. Among other things, these obstacles create a vulnerability to measurement error due to a common mode signal at the voltage electrodes relative to the amplifier reference ground. The above-named obstacles contribute variability to the voltage dividers defined by the input impedance of the amplifier and the impedances between the voltage electrodes and the formation. The finite input impedance of the amplifier circuit allows a small amount of current flow through these variable voltage dividers, converting the common mode voltage into a differential voltage component at the voltage electrodes.

Significant effort has been made to minimize the effects of common mode voltage. For example, one proposed method of reducing the common mode voltage relies on isolating the current source transmitter circuitry from the reference ground of the amplifier. However, attempts to provide a high-impedance isolation for the amplifier have been largely unsuccessful, and the residual sensitivity of the measurement circuitry to the common mode voltage remains too high to gather accurate measurements in boreholes having an oil-based mud.

BRIEF DESCRIPTION OF THE DRAWINGS

In the following detailed description, reference will be made to the accompanying drawings, in which:

FIG. 1 shows an illustrative logging while drilling (LWD) environment;

FIG. 2 shows an illustrative wireline logging environment;

Figure 3:
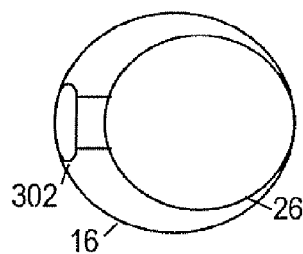
FIG. 3 shows an illustrative first logging tool configuration.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various methods and apparatuses for accurately sensing a voltage potential through a dielectric layer. These methods and apparatuses are applicable to logging instruments and systems for imaging in nonconductive fluids such as an oil-based mud. In some embodiments, the disclosed methods and apparatuses are employed in logging systems having a logging tool in communication with surface computing facilities. The logging tool includes a sensor array having at least two voltage electrodes positioned between at least two current electrodes. The current electrodes inject an excitation signal into a formation forming part of a borehole wall. A displaced electrode amplifier ("DEA") circuit is coupled to the voltage electrodes to measure a differential voltage between the voltage electrodes. The amplifier circuit includes input buffers having feedback to compensate for parasitic elements inherent in the measurement circuitry. As a result, the amplifier's input resistance is markedly increased, and the amplifier's input capacitance is significantly lowered beyond currently available configurations of comparable complexity. Moreover, the amplifier circuit includes tuning resistors that provide greatly reduced sensitivity to common mode voltage signals.

FIG. 1 shows an illustrative logging while drilling (LWD) environment in which a tool having the disclosed amplifier may be employed. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD resistivity imaging tool 26 is integrated into the bottom-hole assembly near the bit 14. As the bit extends the borehole through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

At various times during the drilling process, the drill string 8 may be removed from the borehole. Once the drill string has been removed (as shown in FIG. 2), logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool. The computing facilities may take the form of a personal computer, server, or digital signal processing board, or some other form of computing circuit.

In both the LWD and wireline forms, the resistivity imaging tool include electrode arrays for coupling the displaced electrode amplifier to the borehole wall. FIG. 3 shows a cross-sectional view of LWD resistivity imaging tool 26 in a borehole 16. A biasing mechanism 302 de-centralizes tool 26 to minimize the standoff between the tool's sensors and the borehole wall. The tool's electrode array(s) may be located in a pad on biasing mechanism 302, or alternatively they may be located in the main body of the tool opposite the biasing mechanism. As the tool 26 rotates and progresses downhole at the drilling rate, the electrode arrays will trace a helical path on the borehole wall. Orientation sensors within the tool may be used to associate the resistivity measurements with the electrode positions on the borehole wall. Surface computing facilities may collect resistivity measurements, orientation (azimuth) measurements, and tool position measurements, and may process the collected measurements to create a resistivity image of the rock formation surrounding the borehole.

Figure 4:
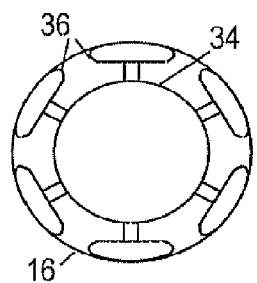
FIG. 4 shows an illustrative second logging tool configuration.

FIG. 4 shows a cross-sectional view of one embodiment of the wireline resistivity imaging tool 34 in a borehole 16, which may also represent an alternative configuration for the LWD resistivity imaging tool 26. Sensing pads 36 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake," and it prevents intimate contact between logging sensors and uncontaminated formation material. In addition, motion of the logging instruments may create a fluid flow layer that further separates the logging sensors from the uncontaminated formation materials.

Figure 5:
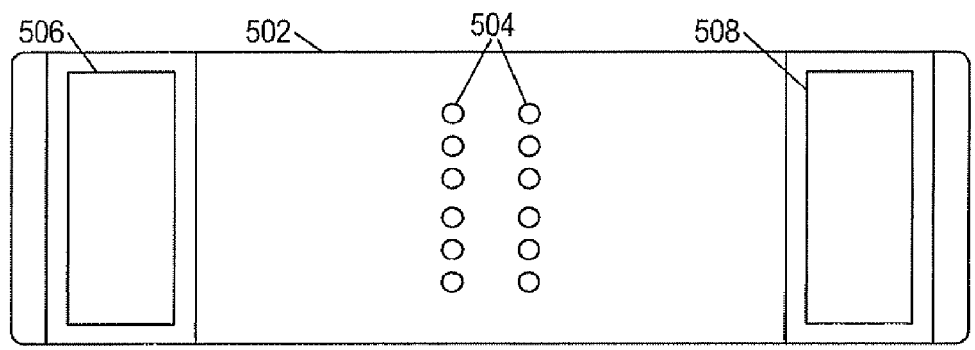
FIG. 5 shows a front view of an illustrative sensor pad.

FIG. 5 shows the face of an illustrative sensor pad 502 having six pairs of voltage electrodes 504 positioned between current electrodes 506 and 508. In practice, the sensor pads may be provided with additional voltage and current electrodes, and in fact may operate on multiple axes. With uniaxial sensor pads such as pad 502, the length of the sensor pad is kept parallel to the long axis of tool 34. The distance between the current electrodes 506, 508 controls the depth of investigation, with greater distances providing greater depths of investigation. The distances between the voltage electrodes 504 control the spatial resolution of the tool, with smaller distances providing higher resolutions.

Figure 6:
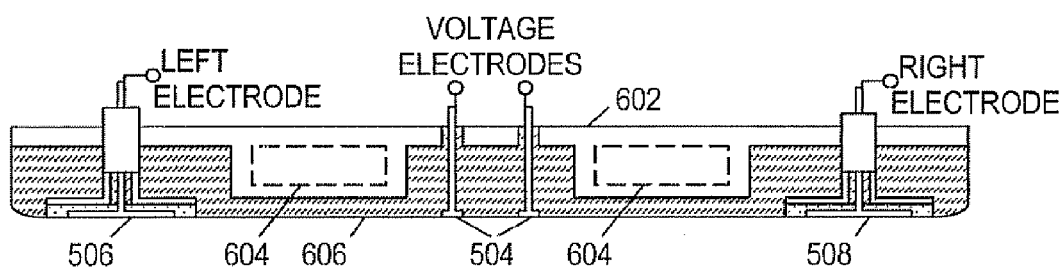
FIG. 6 shows a cross section of the illustrative sensor pad.

A cross-section of the illustrative sensor pad 502 is shown in FIG. 6. Sensor pad 502 comprises a metal substrate 602 to provide the pad with the needed rigidity and strength. The metal substrate 602 may include cavities 604 to hold sensor circuitry. For illustrative purposes, the electrode feeds are shown passing through the sensor pad 502, but the electrode feeds may alternatively connect to the sensor circuitry in cavities 604 or in a central cavity (not shown). In some embodiments, metal substrate 602 comprises steel. The face of metal substrate 602 is covered with an insulating layer 606, which in some embodiments comprises a rubber or polyetheretherketone (PEEK) material. Current electrodes 506 and 508 are embedded on the face of the insulating layer 606.

Figure 7:
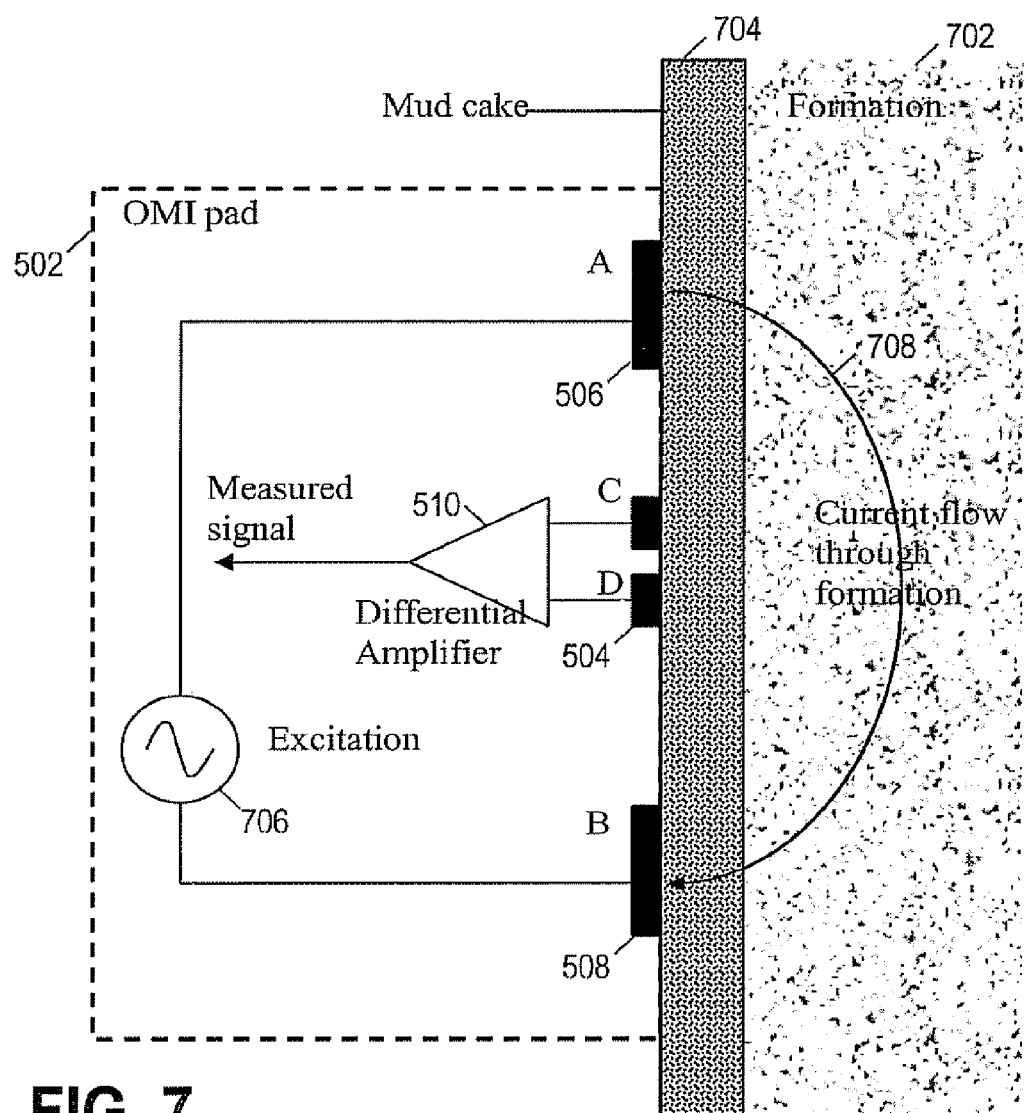
FIG. 7 shows a circuit diagram to illustrate operating principles.

FIG. 7 illustrates the principles behind the operation of the resistivity imaging tool. Sensor pad 502, when pressed against a borehole wall, is separated from the formation 702 by a low-conductivity layer 704 of mudcake. An excitation source 706 injects an alternating current (AC) excitation signal 708 into the formation via current electrodes 506 and 508. The excitation signal 708 creates a voltage drop along the current flow lines in the formation, which can be measured via voltage electrodes C and D. A differential amplifier 510 amplifies (and filters) the voltage difference between the voltage electrodes and provides a measurement signal for acquisition by an analog-to-digital converter. Measurements of the current flow from either (or both) of the current electrodes may be combined with the measured voltage signal to determine a resistivity of the formation in front of the voltage electrodes. The voltage and/or resistivity measurements may be stored for later use and may be communicated to the surface and displayed to a user. In computerized systems, the measurements may be stored in a computer memory or in a long-term information storage device such as a hard disk.

Figure 8:
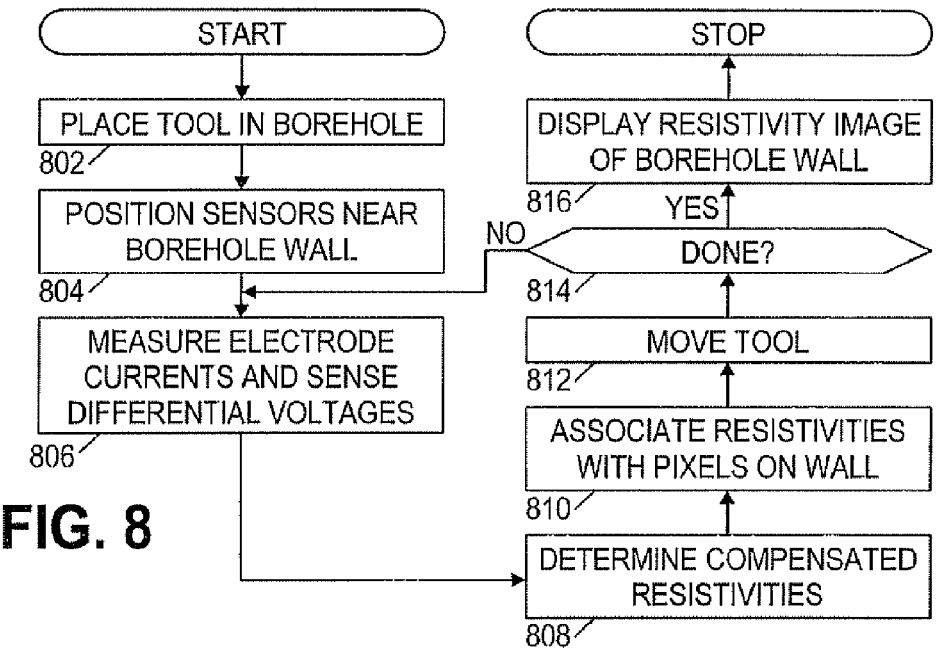
FIG. 8 is a flow diagram of an illustrative imaging method.

A method for using the resistivity imaging tool is described in FIG. 8. In block 802, the resistivity imaging tool is placed in a borehole. For LWD, the tool is part of the bottom hole assembly to perform logging as drilling operations are performed. For wireline logging, the tool is part of a sonde that is lowered to the bottom of the region of interest to perform logging as the logging tool is pulled uphole at a steady rate.

In block 804, the tool is placed in logging mode. For LWD, this operation may (or may not) involve deploying a decentralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall. Blocks 806-814 represent operations that occur during the logging process. Though shown and described in a sequential fashion, the various operations may occur concurrently, and moreover, they may simultaneously occur for multiple voltage electrode pairs and multiple sensor pads.

In block 806, the tool measures the current(s) through the current electrodes, and further measures the voltage difference between the various voltage electrode pairs. In block 808, the tool determines a resistivity measurement for each voltage electrode pair, e.g., by dividing the measured voltage difference by the measured current. In block 810, the tool, or more likely, the surface logging facility coupled to the tool, associates the compensated resistivity measurements with a tool position and orientation measurement, thereby enabling a determination of image pixel values for imaging the lock formation surrounding the borehole.

In block 812, the tool moves along the borehole, and in block 814, a check is performed to determine whether logging operations should continue (e.g., whether the logging tool has reached the end of the region of interest). For continued logging operations, blocks 806-914 are repeated Once logging operations are complete (or in some embodiments, while the logging operations are ongoing), the surface logging facility maps the resistivity measurements into borehole wall image pixels and displays the resulting resistivity image of the surrounding formations in block 816.

The implementation of differential amplifier 510 encounters several performance obstacles in the above-described context. The obstacles include inherent limitations of the circuitry, as well as interactions with the environment, mudcake thickness and properties, and the relative tilt angle of the pad relative to the formation. The high impedance and variability of the mudcake layer creates sensitivity to the common mode signal that could be present at voltage electrodes C and D relative to the amplifier reference ground. (The variability of the impedance between the voltage electrodes (C or D) and the excitation source, together with the finite input impedance of the amplifier, creates a variable voltage divider which can convert the common mode voltage present in the formation to a differential voltage component at the voltage sensing electrodes.)

Figure 9:
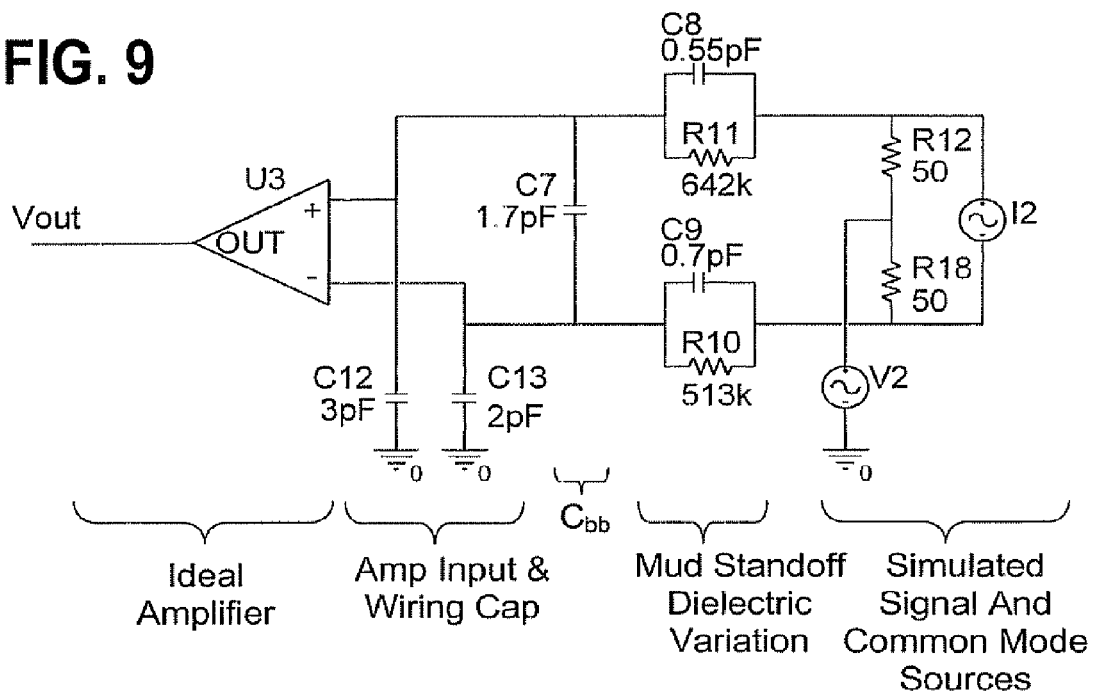
FIG. 9 is a model of various contributors to measurement error.

FIG. 9 illustrates the major parasitic effects that degrade measurement quality even when an ideal operational amplifier ("op-amp") is used. A current source I2 represents the excitation signal that is applied to the formation, which in turn is represented by resistors R12 and R18 (shown with a value of 50Ω each). A voltage source V2 applied to the node between resistors R12 and R18 represents the common mode voltage. A parallel capacitor C8 and resistor R11 (shown as 0.55 pF and 642 kΩ, respectively) represent the complex impedance of the mudcake layer separating the first voltage electrode from the formation, and the parallel arrangement of capacitor C9 and resistor R10 (shown as 0.7 pF and 513 kΩ) represent the mudcake layer separating the second voltage electrode from the formation. Capacitor C7 (shown as 1.7 pF) represents the capacitive coupling between the voltage electrodes, while capacitors C12 and C13 (shown as 3 pF and 2 pF) represent the capacitance of the wiring and amplifier inputs coupled to the voltage electrodes.

The equivalent circuit elements representing the mudcake impedance can vary over a wide range of values. Mismatches in the mudcake impedance, taken together with the shunt capacitances (C7, C12, and C13), make the voltage measurement susceptible to error from the common mode voltage component. The finite input impedance (represented by the shunt capacitances) allows current to flow across the mudcake layer, causing unequal voltage drops in the mud layer in front of the voltage electrodes and adversely affecting the quality of the measurements. As a result, an erroneous and unwanted voltage differential is created between voltage electrodes and is superimposed on the desired voltage difference measurement. The effect of this measurement error may be particularly significant during the measurement of formations with a low resistivity (i.e., less than 5 Ohm-m) using the current injection method described above, because the formation voltage drop to be measured is relatively small.

Figure 10:
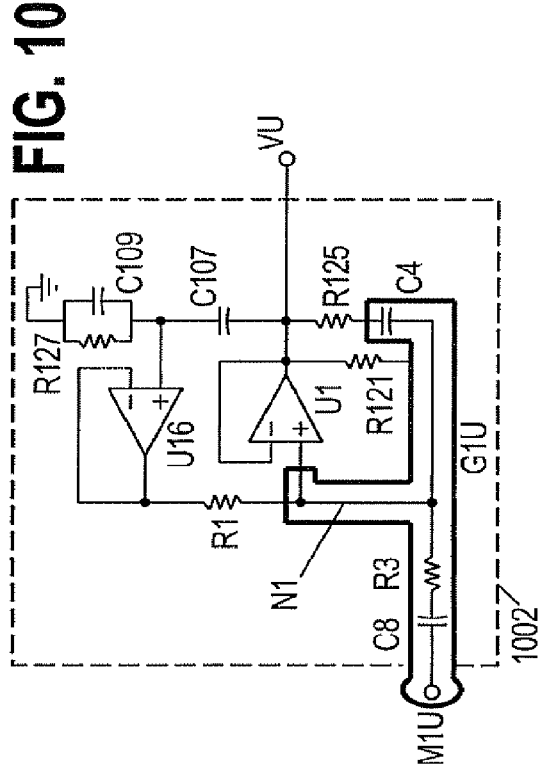
FIG. 10 is a circuit diagram of an input buffer stage.

To combat the current flow allowed by the finite input impedance, a novel circuit configuration is presented having a buffered input with feedback to reduce loading and to increase the effective input impedance. FIG. 10 shows an input buffer stage 1002 having an input node M1U for coupling to a voltage electrode. Each voltage electrode is preferably coupled to a corresponding input buffer stage. The signal from the voltage electrode input node M1U is high-pass filtered by a series combination of a capacitor C8 and resistor R3 before reaching input node N1. This filtering blocks currents that are naturally occurring in earth formations. (As explained below, the input node N1 is supplied with positive feedback, and accordingly the component values of capacitor C8 and resistor R3 are preferably selected to assure unconditional stability for all operating conditions.) Input node N1 is coupled to the noninverting input of op-amp U1. Op-amp U1 has its output coupled to its inverting input, which configures the op-amp to operate as a non-inverting unity gain buffer.

The output of op-amp U1 is coupled to the output node VU, but is also coupled via a positive feedback path to input node N1 to null the equivalent parasitic input capacitance, i.e., the stray capacitance resulting from the input capacitance of op-amp U1, the wiring, the sensor pad, and the tool body. The feedback path includes a series combination of a resistor R125 and a capacitance C4. The values of these components (R125 and C4) are selected in combination with the values of components C8 and R3 to provide maximum gain flatness in the frequency range of interest while operating with maximum source impedance condition. It is specifically noted that a high degree of flexibility exists in choosing component values for the feedback path, and indeed, some embodiments may omit either or both of the components R125 and C4 in favor of a short circuit (e.g., R125 may have a value of 0 ohms, and C4 may be infinite). In tools having multiple voltage electrode pairs ("channels"), the gain for each channel may vary due to the placement of the voltage electrodes. The values of the feedback path components may be adjusted to provide good gain matching between channels. It is further noted that the values of the feedback path components can be adjusted to match (or "tune") the responses of the input buffer stages.

To reduce leakage currents due to stray capacitance, the voltage electrode input node M1U, input node N1, and components C8, R3, and C4 are shielded with a conductive shield or "guard electrode" G1U. The output node VU is coupled to the guard electrode G1U via a resistor R121 to keep the guard electrode at about the same potential as the shielded nodes and components. Because the guard electrode is capacitively coupled to the input node N1 (thereby creating a second feedback path), resistor R121 is provided to preclude instability.

Op-amp U16 has an output that is coupled to its inverting input, configuring it to operate as a voltage follower. The output is further coupled to input node N1 via a large resistor R1 to perform two functions. At zero frequency (aka direct current, or "DC"), the non-inverting input of op-amp U16 is coupled to ground via resistor R127, causing op-amp U16 to provide a high impedance (~200 kΩ) ground reference for op-amp U1, which is desirable for operation in high ambient temperatures. At the frequency range of interest, capacitors C107 and C109 couple the non-inverting input of op-amp U16 between ground and the output node VU, acting as a voltage divider. In the frequency range of interest, the output of op-amp U16, though scaled, follows the output node voltage, effectively increasing the value of R1 by about 500 times. Thus, this secondary positive feedback path minimizes loading effects for AC voltage measurements.

Figure 11:
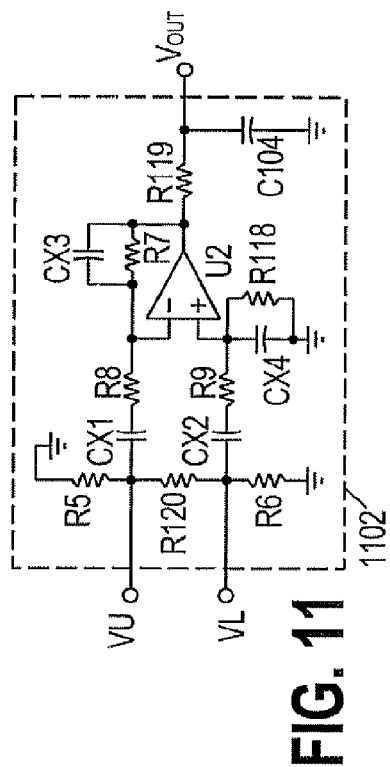
FIG. 11 is a circuit diagram of a differential amplifier stage.

The output node of input buffer stage 1002 can be coupled to a conventional amplifier for single-element use. For differential amplification, the output nodes from input buffer stage 1002 and a second such input buffer stage may be coupled to a differential amplifier stage 1102 such as that shown in FIG. 11. Working backwards, the output node Vout is coupled to ground via a capacitor C104 and coupled to the output of op-amp U2 via resistor R119. In this configuration, resistor R119 and capacitor C104 act as a low pass filter to smooth the differential voltage measurements and prevent aliasing during analog-to-digital conversion.

The output of op-amp U2 is coupled to its inverting input via a first impedance formed by a parallel combination of capacitor CX3 and resistor R7, and the inverting input in turn is coupled via a second impedance to the output node VU of an input buffer stage. The second impedance is formed by a series combination of capacitor CX1 and resistor R8. The output node VL of the other input buffer stage is coupled to the non-inverting input of op-amp U2 via a series combination of capacitor CX2 and resistor R9, which together provide an impedance value equal to the second impedance. The non-inverting input of op-amp U2 is further coupled to ground via a parallel combination of capacitor CX4 and resistor R118, which together provide an impedance value equal to the first impedance. Configured in this manner, op-amp U2 is designed to produce an output signal that amplifies the difference between the input signals by a gain equal to the ratio of the first impedance to the second impedance. The impedance values may be chosen to provide a bandpass frequency response that passes the frequency range of interest.

It is noted that the frequency responses of the input buffer stages may not be precisely matched. Accordingly, the differential amplifier stage 1102 may be provided with a tuning configuration of three resistors R5, R6, and R120. Resistor R120 is a reference resistor coupled between output nodes VU and VL to aid in matching the frequency response of the output stages, and may illustratively take a value of about 1 kΩ. Tuning resistors R5 and R6 are select by test ("SBT") components that are tailored for each tool to provide deep nulls in the common mode rejection response at the frequencies of interest. In this manner, exceptional common mode rejection can be achieved in the presence of high input source impedances.

Figure 12:
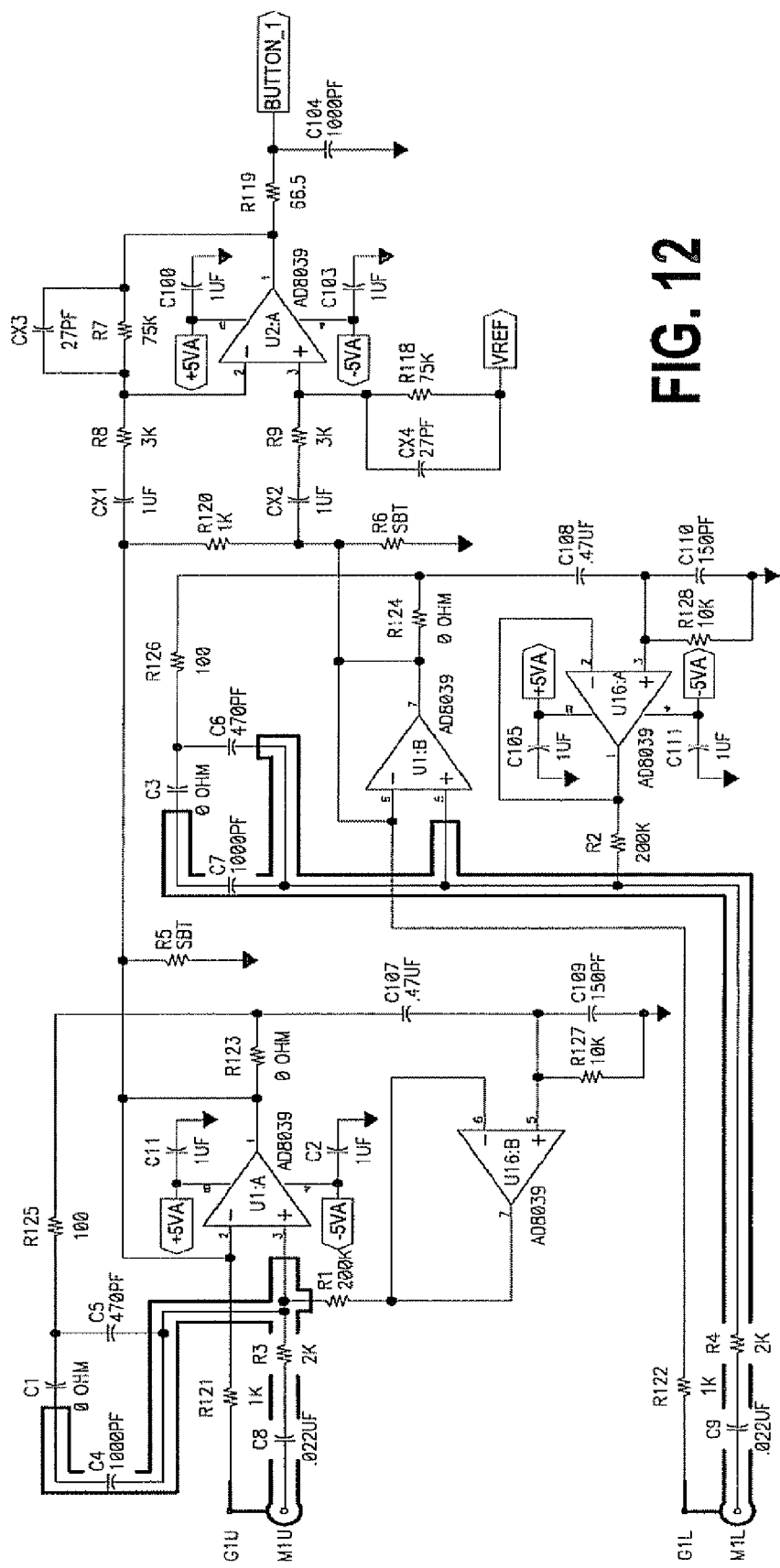
FIG. 12 is an electrical schematic of a displaced electrode amplifier in accordance with certain preferred embodiments.

FIG. 12 shows a complete schematic of two input buffer stages coupled to a differential amplifier stage, with component values provided. The schematic also shows zero ohm resistors R123 and R 24 in the feedback paths of the input buffet stages. As indicated by their values, these resistors are not currently part of the preferred design. However, the selection of a low value of resistance for R123 acts to impart a slight phase shift to the positive feedback path, which provides an alternate means for matching the AC responses of the input buffer stages when operating from a very high impedance source. In some applications it may be advantageous to utilize this method to provide deep common mode nulls, and/or to provide good gain matching between receiver channels in a multi-channel application.

Accordingly, there has been disclosed herein a displaced electrode amplifier (DEA) suitable for measuring voltages in a test object via one or more electrodes that are separated from the test object by a layer of high impedance material. The disclosed amplifier is also suitable for measuring voltages from other high impedance source configurations. Single amplifier and differential amplifier configurations are disclosed. Differential voltages can be measured with very high common mode rejection ratios due to the high input impedance of the disclosed amplifier and disclosed configurations for matching frequency responses of different inputs Positive feedback is used to compensate for parasitic shunt components (input signal leakage paths), further increasing the amplifier's input impedance. In some embodiments, reference voltages are provided via a high DC impedance path, which is further augmented by positive feedback to provide very high impedance to AC signals, thereby minimizing loading effects for these signals.

A variety of voltage electrode geometries are possible and may be used. A greater number of voltage electrodes may provide higher resolution at the expense of increased processing costs. The operating voltages and currents may vary widely while remaining suitable for the logging operations described herein. It has been found that source current frequencies above about 5 kHz, and perhaps as high as 100 kHz or more, are desirable as they reduce the mud layer impedances and increase the voltage differences measurable between the voltage electrodes. In some tool embodiments, the source current frequency may be switchable between low frequency (e.g., 10 kHz) and high frequency (e.g., 80 kHz) for measurements in formations of differing resistivity. Higher frequencies may be preferred for formations having a generally lower resistivity, and vice versa.

The disclosed amplifier configuration is useful for implementing an oil-based mud resistivity imaging tool, but its application is not limited to this particular tool type, nor is it limited oil-field application. It may find application in fields where non-destructive or non-invasive testing are desired (egg, building and highway inspections, airframe testing, medical examinations) as well as use for measurements in hostile environments (high-temperature, explosion hazard, or quarantine environments) where contact measurements are undesirable or infeasible.

While illustrative embodiments of this invention have been shown and described, modifications thereof can be made by one skilled in the art without departing from the spirit or teaching of this invention. The embodiments described herein are illustrative and are not limiting Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:
1. A displaced electrode amplifier that comprises:
  a first operational amplifier ("op-amp") having an inverting input, a non-inverting input, and an output, wherein the output is coupled to the inverting input to configure the op-amp as a unity gain buffer;

a first feedback impedance coupled between the output and the non-inverting input to at least partly compensate for a parasitic shunt impedance coupled to the non-inverting input;

a second op-amp having an inverting input, a non-inverting input, and an output, wherein the output of the second op-amp is coupled to the inverting input of the second op-amp to configure the second op-amp as a unity gain buffer;

a second feedback impedance coupled between the output of the second op-amp and the non-inverting input of the second op-amp to at least partly compensate for a parasitic input shunt impedance; and a differential amplifier stage coupled to the outputs of the first and second op-amps to produce an amplified difference signal.

2. The displaced electrode amplifier of claim 1, wherein the feedback impedance comprises a series combination of a capacitor and a resistor.

3. The displaced electrode amplifier of claim 1, further comprising:
an input impedance coupled between the non-inverting input of the first op-amp and a sensing electrode.

4. The displaced electrode amplifier of claim 3, wherein the input impedance comprises a series combination of a capacitor and a resistor.

5. The displaced electrode amplifier of claim 1, further comprising:
an electrically conductive shield for capacitance guarding the non-inverting input of the first op-amp to a sensing electrode; and
a resistor coupled between the output of the first op-amp and the electrically conductive shield.

6. The displaced electrode amplifier of claim 1, further comprising a large resistor coupled between the non-inverting input of the first op-amp and a reference node.

7. The displaced electrode amplifier of claim 6, wherein the reference node is driven by a third op-amp having its output coupled to its inverting input, and having its non-inverting input coupled to ground via a second resistor.

8. The displaced electrode amplifier of claim 7, wherein the non-inverting input of the third op-amp is further coupled to the output of the first op-amp via a capacitor to drive the reference node with positive feedback to magnify the effective value of the large resistor.

9. The displaced electrode amplifier of claim 1, wherein the differential amplifier stage includes a reference resistor coupled between the outputs of the first and second op-amps.

10. The displaced electrode amplifier of claim 9, wherein the differential amplifier further includes a tuning resistor coupled between a reference voltage and one of the outputs of the first and second op-amps, wherein the tuning resistor has a value selected to provide a null in a common mode rejection response of the displaced electrode amplifier.

11. An oil-based mud imaging tool that comprises:
a sensor array having one or more voltage electrodes and one or more current electrodes, wherein the one or more current electrodes are energized by an excitation source to create an oscillatory current flow in a borehole wall; and
at least one displaced electrode amplifier coupled to the one or more voltage electrodes to measure a differential voltage created by the oscillatory current flow, wherein the displaced electrode amplifier employs positive feedback to nullify parasitic input shunt impedances of the voltage electrodes, wherein the displaced electrode amplifier comprises:
two input buffer stages each coupled to a respective one of the voltage electrodes to provide the positive feedback, comprising:
a first operational amplifier ("op-amp") having an inverting input, a non-inverting input, and an output, wherein the output is coupled to the inverting input to configure the op-amp as a unity gain buffer;
a first feedback impedance coupled between the output and the non-inverting input to at least partly compensate for a parasitic shunt impedance coupled to the non-inverting input;
a second op-amp having an inverting input, a non-inverting input, and an output, wherein the output of the second op-amp is coupled to the inverting input of the second op-amp to configure the second op-amp as a unity gain buffer;
a second feedback impedance coupled between the output of the second op-amp and the non-inverting input of the second op-amp to at least partly compensate for a parasitic input shunt impedance; and
a differential amplifier stage coupled to the input buffer stages to the outputs of the first and second op-amps to measure the differential voltage.

12. The tool of claim 11, wherein the differential amplifier stage also operates to match the responses of the input buffer stages in a frequency range of interest.

13. The tool of claim 11, wherein each of the input buffer stages includes a high impedance reference voltage that is not susceptible to bias currents that commonly develop under high operating temperatures.

14. The tool of claim 11, wherein each of the input buffer stages drives the high impedance ground reference with positive feedback to reduce loading in a frequency range of interest.

15. The tool of claim 11, wherein each of the input buffer stages further includes an electrically conductive shield for wiring to the corresponding voltage electrode, and wherein the electrically conductive shield is driven from an output signal of the input buffer stage.

16. A displaced electrode amplifier sensing method that comprises:
buffering a voltage from a first input node with a first operational amplifier ("op-amp") to produce a first output signal that is coupled to an inverting input of the first op-amp to configure the first op-amp as a unity gain buffer;
at least partly compensating for a parasitic shunt impedance with a first feedback impedance coupled between the first op-amp's output and a non-inverting input of the first op-amp;

buffering a voltage from a second input node with a second op-amp to produce a second output signal that is coupled to an inverting input of the second op-amp to configure the second op-amp as a unity gain buffer;

at least partly compensating for a parasitic shunt impedance with a second feedback impedance coupled between the second op-amp's output and non-inverting input of the second op-amp; and combining the first output signal with the second output signal with a differential amplifier to produce an amplified difference signal.

17. The method of claim 16, further comprising:

coupling the first input node to a high impedance reference node.

18. The method of claim 17, further comprising:

driving the high impedance reference node with a feedback signal to increase an effective value of a resistor that couples the first input node to the high impedance reference node.

* * * * *